June 25, 1935.   W. O. WRIGHT   2,005,766
LUBRICATION
Filed May 29, 1931   3 Sheets-Sheet 1
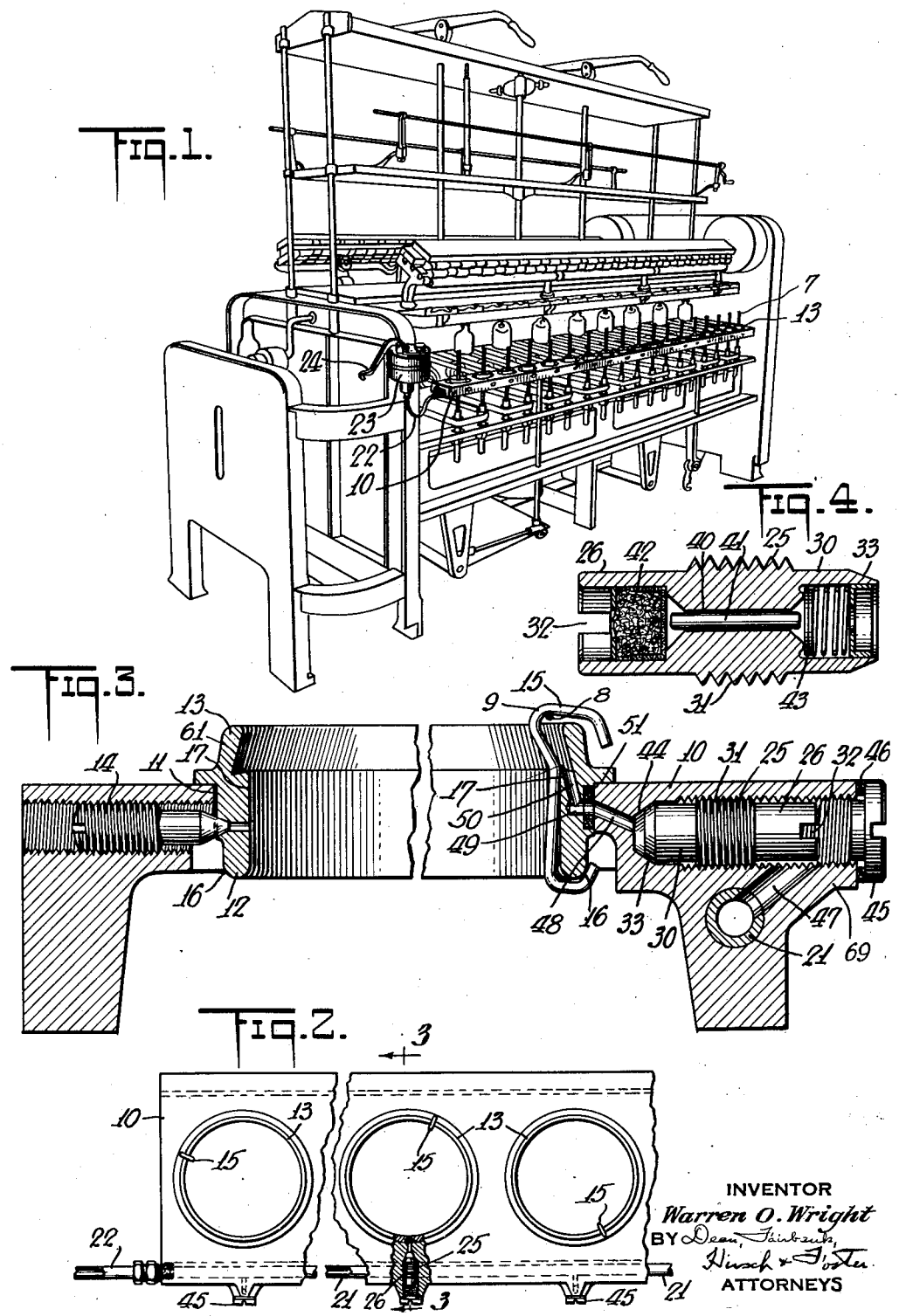
INVENTOR
Warren O. Wright
BY
ATTORNEYS June 25, 1935.   W. O. WRIGHT   2,005,766
LUBRICATION
Filed May 29, 1931   3 Sheets-Sheet 2
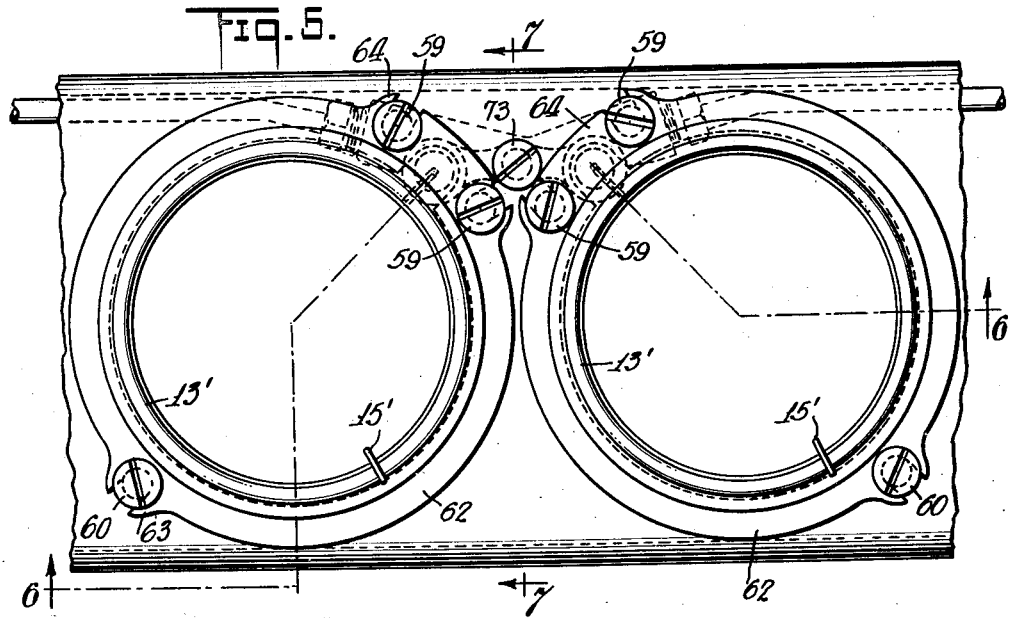
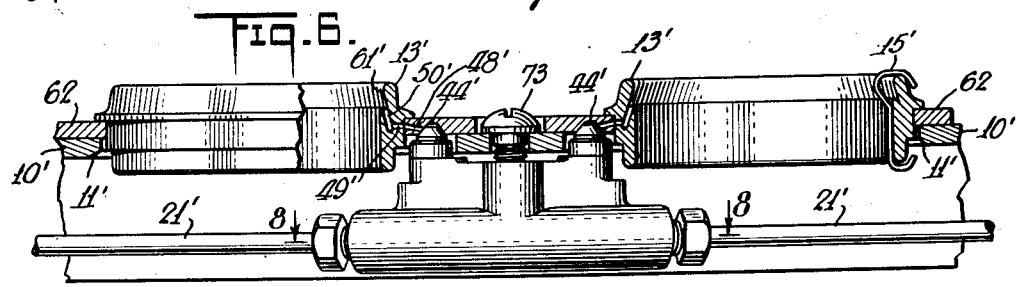
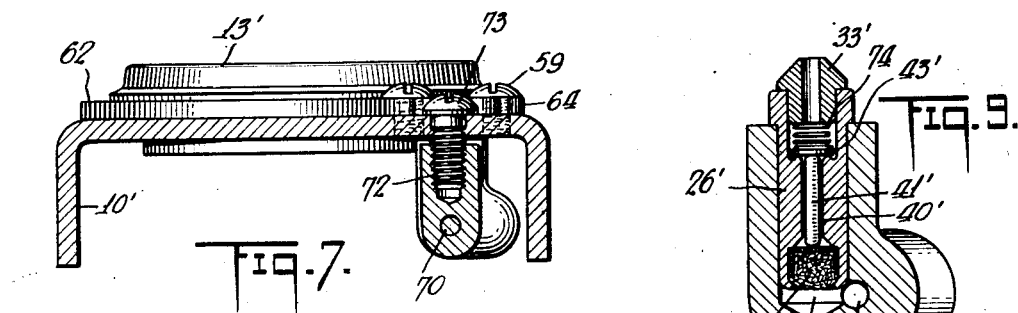
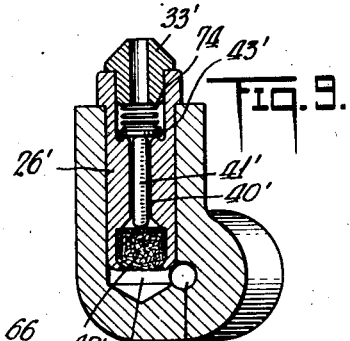
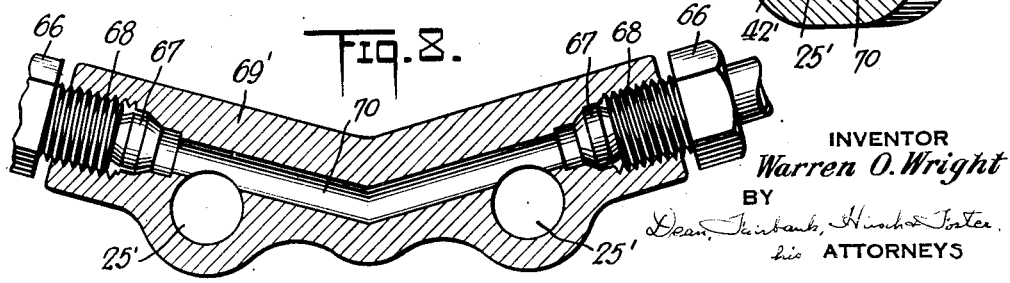
INVENTOR
Warren O. Wright
BY
his ATTORNEYS June 25, 1935.     W. O. WRIGHT     2,005,766
LUBRICATION
Filed May 29, 1931     3 Sheets-Sheet 3
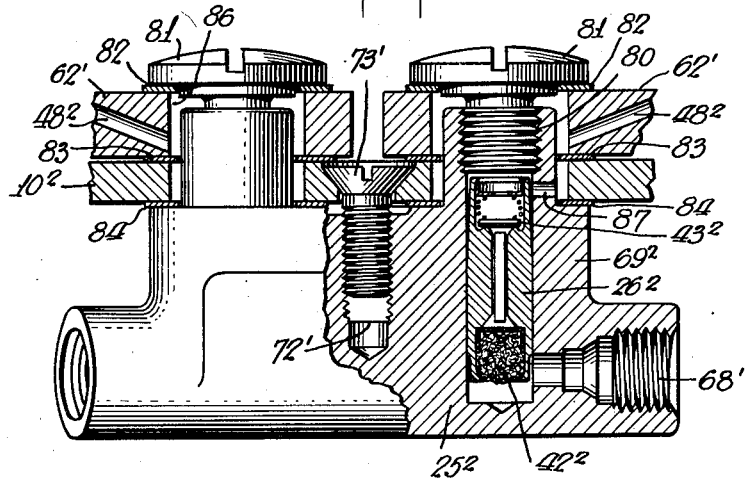
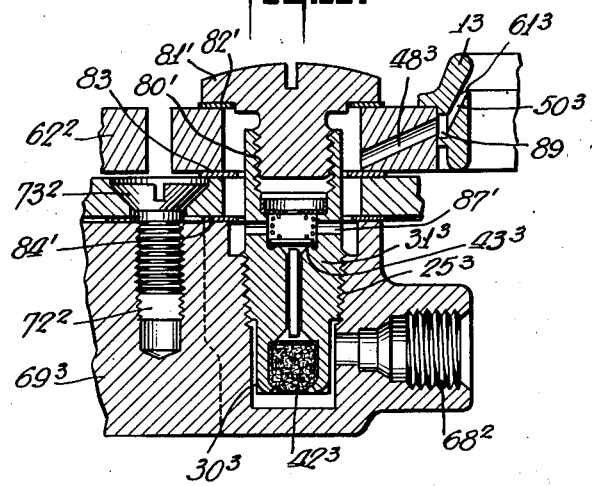
INVENTOR
Warren O. Wright
BY
his ATTORNEYS Patented June 25, 1935

2,005,766

UNITED STATES PATENT OFFICE 2,005,766

LUBRICATION

Warren O. Wright, Freeport, N. Y., assignor to Auto Research Corporation, Wilmington, Del., a corporation of Delaware Application May 29, 1931, Serial No. 540,899

24 Claims. (Cl. 184—7)

The present application relates to lubrication and it particularly relates to a central lubricating system which may be applied to the rings utilized in connection with spinning and twisting machines.

Prior to the present invention the rings of ring rails were periodically lubricated by hand, the operator at intervals stopping the machine and dabbing a bit of grease at one side of the ring with his finger. In practice the likelihood was always present that either excess grease would be applied resulting in staining or marking the material being processed, or insufficient grease would be applied resulting in excessive wear of the rings and of the travellers bearing thereon. Ordinarily in such manual applications the grease would not spread itself or be spread by the traveller over the bearing surface until sufficient heat had been generated by friction to liquefy it. Sufficient heat for this purpose would only arise because of insufficient lubrication during the periods immediately subsequent to the manual lubricant application. Although light liquid lubricants were known to be more satisfactory for this purpose, they could not be most satisfactorily utilized because of the difficulty of placing sufficiently small quantities thereof upon each ring by hand without any excess which would cause marking of the processed material.

An object of the present invention is therefore to provide a lubricating installation for the rings of a ring rail of a spinning or twisting machine, which will automatically supply a sufficient minute metered quantity of liquid lubricant to each ring without at the same time yielding sufficient excess thereof to cause discoloration of the material being processed, and without selective manual operation endangering the fingers and hands of the operators of the machine.

Another object is to provide a lubricating installation for the ring rails of spinning and twisting machines, which will supply liquid lubricant to each ring in the desired quantities and at the desired intervals without stopping the machine, in such a manner that the lubricant so supplied substantially immediately upon application will spread over the entire bearing surface.

Another object is to provide a centralized lubricating installation for the rings of a ring rail, which installation will include flow metering outlets of such small bulk as to adapt themselves to be readily incorporated in the interior of the structure, said outlets being of such a character as to assure equitable proportioning among the various rings of the total charge of lubricant, even though said charge be quite minute and regardless of the different distances of the rings from the source of lubricant, and gradual dispensation of said lubricant to the bearing surface of the rings without spurting the entire charge thereupon.

Another object is to provide a protected, reliable and centralized lubricating installation for the rings of a ring rail of a spinning or twisting machine, which may be readily built into said rail without materially changing the same or weakening any of the parts thereof.

Another object is to incorporate a lubricating installation with ring rails of spinning or twisting machines in such a compact manner, that such ring rails with incorporated lubricating systems might be merchandised, shipped, and sold separately from the machines as distinct articles of manufacture and utilized to replace other ring rails already in machines not provided with such central lubricating systems, without necessitating any separate or additional assemblies and without having any projecting, protruding, or other parts liable to be knocked off in handling.

Other objects are in part obvious and in part pointed out hereinafter.

A feature of the present invention consists in having a lubricant conduit extend along and be protected by the body of a ring rail, said conduit cooperating with spaced flow metering devices or drip plugs, one for each ring in said rail, which receive lubricant from said conduit and distribute it in predetermined quantities to said ring. A source of lubricant supply, such as a pump, is conveniently connected to the conduit at one end of the ring rail, said source or pump being conveniently positioned either upon the ring rail or upon the adjacent supporting frame.

Another feature of the present invention resides in utilizing a drip plug system such as disclosed in Patent No. 1,632,771 for supplying the predetermined metered proportions of lubricant to each ring rail, said drip plug outlets not only assuring a slow gradual feed of lubricant, but also dividing the total charge of lubricant into the proper proportions for each ring. The lubricant from the drip plugs is preferably fed into and/or upon distributing grooves or shelves adjacent the bearing portion of the ring from which grooves or shelves the lubricant will distribute itself over the entire bearing surface. The grooves or shelves, if on the inside of the ring, are preferably positioned so as to be above the bearing surfaces but substantially below the portions of the ring adjacent the material being processed.

In one embodiment of the present invention a lubricant conduit, for example taking the form of copper pipe, is cast into a rail so as to extend the entire length thereof. The rail is then provided with a series of parallel sockets transverse to and communicating with said conduit into which sockets are inserted drip plugs or other flow metering outlets. Intercommunicating bores are formed in the rings and in the rails leading from the drip plug sockets, the combination being so constructed as to prevent substantially any leakage in the transfer of lubricant from the rail bores to the ring bores.

In other embodiments, which are particularly adapted to sheet metal rails, not having sufficient body themselves to carry sockets, separate socketed drip plug carrying elements are provided and these elements are attached by suitable arrangements directly to the rail. The drip plug carrying socketed structures are preferably provided with suitable coupling arrangements by means of which the lubricant passing the drip plug will be fed directly to the distributing grooves or shelves of the ring.

In the accompanying drawings, in which are shown one or more of the several features of one embodiment of the invention—

Figs. 1 to 4 illustrate one embodiment of the present invention, in which Fig. 1 shows in perspective a twisting machine with a ring rail in position and with a tank for supplying lubricant to a central system incorporated with said rail placed upon the machine frame, Fig. 2 shows a top view upon an enlarged scale of an end of a ring rail in fragmentary section, Fig. 3 is a side sectional view on a larger scale upon the line 3—3 of Fig. 2, and Fig. 4 is a longitudinal sectional view of a typical flow metering device which may be utilized;

Figs. 5 to 9 represent another embodiment in which Fig. 5 is a fragmentary top view of a portion of a ring rail, Fig. 6 is a side sectional view upon the lines 6—6 of Fig. 5, Fig. 7 is a transverse sectional view upon the lines 7—7 of Fig. 5, and Figs. 8 and 9 are transverse and side sectional views of the socketed drip plug carrying element, Fig. 8 being taken upon the line 8—8 of Fig. 6; and Figs. 10 and 11 are alternative embodiments of socketed drip plug carrying elements, Fig. 10 being a side view in fragmentary section and Fig. 11 being a side sectional view.

In Fig. 1 is shown diagrammatically a typical twisting machine provided with the rail 10 having a series of closely spaced apertures 11 into which are inserted the skirts 12 of a series of rings 13 which rail and accompanying rings are shown on a large scale in Figs. 2 and 3. The skirt portions 12 of the rings 13 are held in position in said apertures 11 by the set screws 14. Partly embracing the rings and travelling thereon at a very high velocity in the order of about a mile a minute are the guides or travellers 15. Passing through a bulge 9 at the inner upper portion of the traveller is the cord, twine or yarn 8. This cord, twine or yarn 8 is drawn down from above and is wound upon spools or bobbins (not shown) on the rotating shafts 7, the rail 10 periodically moving up and down to distribute the processed material in the desired manner upon said spool or bobbin. The centrifugal force due to the high rotation of velocity of the traveller together with the upward pull exerted by the material 8 will cause the traveller to take the position shown in Fig. 3 with the formation of bearing surfaces at the places indicated by the numerals 16 and 17. The construction and manner of operation so far described are quite typical of twisting frames and form no part of the present invention.

As shown in Figs. 2 and 3, the ring rail 10 is provided with a conduit 21 extending the length thereof, preferably in the form of a copper or aluminum pipe which may be cast therein. The end of the conduit 21 may be connected to a suitable, flexible tube or hose 22 (see also Fig. 1), which communicates with the tank 23 supported on the side frame of the machine. The tank 23 serves as a reservoir for lubricant and may be desirably provided with a lever 24 by means of which a pump enclosed within the tank may be conveniently actuated to force a charge of lubricant into the conduit 21. Preferably opposite to the set screws 14 are a series of embossments or enlargements 69 of the ring rail which carry the parallel tapped sockets 25 receiving the drip plugs or other flow metering devices 26.

Each drip plug has a cylindrical body 30, the medial portion of which has a threaded enlargement 31 and the inlet and outlet ends of which are provided respectively, with a slotted end 32 and with a conical sealing nose 33.

As shown in Fig. 4, the drip plug may be provided with a central bore 40 substantially filled by a pin 41, the inlet and outlet ends of which both are enlarged respectively, to receive a filter plug 42 and a valve 43. The conical nose 33 is forced against the sloping shelf 44 at the bottom of the tapped socket 25 and seals the outer portion of said socket from the inner portion of said socket with the result that the only communication therebetween is through the drip plug 26. The outer end of the tapped socket 25 is closed by means of the plug 45 and the gasket 46. Establishing communication between the conduit 21 and the outer portion of the socket 25 is the bore 47. Conducting lubricant from the outlet end of the drip plug and the inner portion of the socket 25 to the ring rail are the rail bore 48 and the ring bores 49 and 50. The copper or vellumoid gasket 51 forms a substantially liquid-tight connection between the rail bore 48 and the ring bore 49. The inner surface of the ring is provided with a sloping shoulder 61 which is adapted to receive and collect the lubricant passing out of the bore 50 and then distribute it around the upper bearing surface 17. From the upper bearing surface 17 the lubricant will flow downwardly to the lower bearing surface 16.

In operation, at periods depending upon the lubricant requirements, the lever 24 is manipulated and a shot of oil forced into the normally lubricant-filled conduit 21, the drip plugs 26 distributing the shot of lubricant in substantially equal proportions to each of the ring rails to lubricate the bearings 17 and 16 thereon by overflow from the oil-filled bores 48, 49 and 50. As a specific example of the application of the present invention in one instance it was found that 2 drops of a compounded oil of 150 Saybolt seconds viscosity would suffice to lubricate the ring bearings for a period of four hours.

In the embodiment of Figs. 5 and 6 the ring rail 10' is made of heavy sheet metal and is provided with a series of openings 11' around which the ring holders 62 are attached by the screws 59 and 60. The holders 62 are provided with a series of diametrically opposite slotted projections or ears 63 and 64 which provide for the attachment of the screws 60 and 59. The rings 13' are press-fitted or shrunk into the holders 62.

The lubricating installation comprises a series of pipe sections extending the length or part of the length of the rail, which pipe connections are connected by the coupling nuts 66 and coupling sleeves 67 to tapped sockets 68 in the socketed drip plug or flow controlling unit carrying structures 69'. The structure 69' is provided with a longitudinal passage 70 and with transverse sockets 25' into which are press-fitted the drip plug units 26', said units being of similar construction as those shown in Fig. 4 (similar functioning parts being indicated by the same numerals primed). The drip plug carrying element 69' is provided with a tapped socket 72 into which is threaded the screw 73 which attaches said element to the ring rail 10'. Press-fitted into the outlet socket of the drip plug 26' is a nozzle member 33', which also serves as a reaction member for the valve spring 74. The ring carrying element 62 is provided with conical sockets or depressions 44' which are adapted to cooperate with the tapered nose 33' to form a liquid-tight connection, by means of which lubricant may pass from the drip plug through the bores 48', 49' and 50' to the distributing shelf 61'. The screw 73 serves to draw the conical noses 33' in liquid-tight engagement with the conical depression 44', the ring holder 62 being provided with two screws equally spaced on either side of the point of engagement between the nose 33' and the socket 44' so that the ring 13' will not be canted upon drawing up of said socketed holder 69'.

In Fig. 10 the holder 69² is provided with the tapped socket 68' enabling coupling of suitable conduit sections and is also provided with the vertical sockets into which may be press-fitted the drip plugs 26² or other flow controlling devices, the particular device shown being of substantially the same construction as already shown and described in connection with Figs. 4 and 9 (similarly functioning parts being designated by the same numeral provided with a superior 2.) In this embodiment the socketed member 69² is drawn up to the ring rail by means of the flat headed screw 73' which fits into the tapped socket 72' therein. The flow metering device 26² is entirely enclosed in the inner portion of the socket 25² and the outer portion of said socket is tapped at 80 and receives the threaded studs 81 which compress the gaskets 82, 83 and 84 between the stud 81, the ring holder 62', the rail 10², and the socketed carrying member 69² respectively. In this manner an annular lubricant tight compartment 86 is formed which communicates with the outlet of the drip plug by the bore 87 through the member 69² and with the ring by means of the bore 48² communicating with the ring rail retainer.

The embodiment of Fig. 11 functions very similarly to the embodiment of Fig. 10 (similarly functioning parts being designated by the same numerals with the next numerically larger suffix), the drip plug in this case, however, being laterally threaded at 31³ to retain it in a correspondingly tapped socket 25³, and the stud 81' cooperating with a tapped socket 80' in the end of the drip plug itself. In this embodiment the ring 13 is shown provided with an external distributing groove 89 which may be provided with a series of spaced bores 50³ to assure more equitable distribution of lubricant around the sloping shelf 61³.

Although in Fig. 1 the main is shown as extending along the entire length of the rail 10, with the pump connection attached thereto at one end, it is usually desirable in the case of long ring rails (e. g. exceeding 20 to 30 feet in length) to provide a main of relatively large diameter (e. g. ½" internal diameter) along the machine longitudinally of the rail, which main may be coupled by suitable flexible connections to the relatively small diameter main (e. g. 0.106" internal diameter) or to a series of mains upon the rail each supplying a group of rings, thus reducing the tendency toward pressure drops at the drip plugs farther removed from the pump.

Instead of the lubricant tank and pump being positioned upon the side frame, it might be conveniently built into the ring rail. Also, if desirable, the lever 24 might be so positioned as to be actuated each time the ring rail moves during operation, or other automatic means may be provided to give intermittent shots of lubricant or a substantially continuous supply thereof.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

I claim:—

1. A lubricating installation for a machine of the type involving an elongated structural member having a multiplicity of closely associated bearing apertures therethrough, each supporting a movable bearing element, each bearing requiring an occasional small supply of lubricant; said installation comprising a main feed conduit longitudinal of and substantially rigid with said structural member and in protected position in respect thereto, a socket bored in said member adjacent each aperture, branch conduits from said main conduit to one side of said sockets and from the other side of said sockets to and then through the respective bearing apertures, flow delivery elements in each of said sockets preventing communication from the inlet to the outlet sides of the sockets except through the elements, a lubricant inlet for said main conduit, and means for maintaining said main and branch conduits substantially filled with lubricant during the intervals between lubricating operations.

2. A lubricating installation for a machine of the type involving an elongated structural member having a multiplicity of closely associated apertures therethrough, fixed bearing elements in said apertures each supporting a movable bearing element, each bearing requiring an occasional small supply of lubricant; said installation comprising a main feed conduit longitudinal of and substantially rigid with said structural member and in protected position in respect thereto, sockets adjacent each aperture transverse to said conduit, said sockets being bored and tapped in said member, branch conduits from said main conduit to one side of said sockets and from the other side of said sockets to and then through said fixed bearing elements, highly restricted drip plug metering elements in each of said sockets prevent communication from the inlet to the outlet sides of the sockets except through the elements, a lubricant inlet at one end of said main conduit, and means for maintaining said main and branch conduits substantially filled with lubricant during the intervals between lubricating operations.

3. A lubricating installation for a machine of the type involving an elongated structural member having a multiplicity of closely associated apertures therethrough, said member being provided with an integral enlargement adjacent each aperture, fixed bearing elements in said apertures, each supporting a movable bearing element, each bearing requiring an occasional small supply of lubricant; said installation comprising a main feed conduit longitudinal of and substantially rigid with said structural member and in protected position in respect thereto, sockets in said enlargements, branch conduits from said main conduit to one side of said sockets and from the other side of said sockets to and then through said fixed bearing elements, highly restricted drip plug metering elements in each of said sockets preventing communication from the inlet to the outlet sides of the sockets except through the elements, a lubricant inlet at one end of said main conduit, distributing troughs associated with said fixed bearing elements, and means for maintaining said main and branch conduits up to said troughs substantially filled with lubricant during the intervals between lubricating operations.

4. A lubricating installation for a ring rail for spinning and twisting machines comprising a conduit formed in the body of the rail and extending the length of the ring rail, a lubricant pressure and supply means connected to one end of said conduit, a series of drip plugs, one for each ring, also enclosed in the body of the ring rail and connecting conduits establishing communication between said conduit, said drip plugs and said rings.

5. A lubricating installation for a socketed cast ring rail for spinning and twisting machines comprising a metallic conduit cast therein extending the length of the ring rail and supported thereby, a lubricant pressure and supply means connected to one end of said conduit, a series of drip plugs enclosed in sockets in said rail, one for each ring, also supported upon the ring rail and connecting conduits establishing communication between said conduit, drip plugs and said rings.

6. A lubricated ring rail construction including a ring rail with a series of openings with rings fixed therewithin, said construction comprising collecting troughs extending entirely around each of said rings substantially above the bearing surfaces thereof, but substantially below the tops thereof, sockets in and conduits through the rails and through the rings for supplying lubricant to said troughs and an inlet to the said conduits, said sockets receiving flow metering devices.

7. In combination with a machine including a series of bearings having fixed bearing elements and movable bearing elements, a lubricating installation comprising a lubricant inlet, lubricant conduits extending through the body of the machine to and through said fixed bearing elements from said inlet, sockets upon said conduits integrally incorporated in said fixed bearing elements, said sockets being accessible from the outside of the machine, plugs positioned in said sockets for determining the flow of lubricant through the conduits and additional plugs sealing the outside of said sockets.

8. In combination with a machine including series of spaced bearings with fixed and movable bearing elements; a lubricating installation comprising a lubricant inlet, a branched distribution system extending from said inlet to and through said fixed bearing elements, said system consisting in substantial part of bores through the machine structure, a series of tapped sockets integrally incorporated in said machine structure, one socket being positioned in each branch and each socket being so positioned as to be readily accessible from the exterior of the machine, a series of threaded drip plugs enclosed in said sockets and plugs for closing the open ends of said sockets.

9. The lubricating installation of claim 8 in which the bottoms of the sockets are provided with conical depressions and the cooperating ends of the drip plugs are provided with conical noses to effect lubricant-tight connections with said depressions and seal the inlet portion of the socket from the outlet portion thereof except through the drip plug.

10. A multiple flow controlling unit comprising a fitting with a tapped inlet socket, an outlet nipple, an intermediate socket cooperating with said inlet socket and said nipple, an attaching bolt receiving socket and a flow controlling element in said intermediate socket, said outlet nipple and said intermediate socket being axially aligned and said tapped inlet socket extending transversely to and opening into said intermediate socket.

11. In a unitary dividing or junction fitting comprising a casting having a plurality of sockets and a tapped opening adjacent the open end of said sockets for mounting upon a supporting structure, unitary nipples protruding laterally from the closed inner ends of the sockets and conformed for mounting pipe terminals and communicating with the interior of said sockets, and flow restricting units secured within said sockets and affording clearance near said nipples to permit flow of lubricant from one nipple to the other contemporaneously, with flow of lubricant past the restrictions.

12. The combination set forth in claim 11 in which each of the flow restricting units comprises a cartridge having a restriction pin in a longitudinal bore therethrough and having a spring-seated check valve.

13. A restriction fitting unit for a flow controlling system comprising a cartridge having a restriction pin in a longitudinal bore of slightly larger diameter, said cartridge being threaded intermediate its ends, and of reduced diameter upon both sides of said threaded portion, a felt strainer plug in a socket at the inlet side of said socket, a valve seat unitary with said cartridge near the outlet end thereof and a check valve spring-pressed against said seat.

14. In combination with a liquid distributing system, a double socket-carrying junction member, a lubricant inlet bore communicating with the bottom of the sockets, flow controlling plugs adapted to plug said sockets provided with substantially central liquid passageways with sockets at each end thereof, with strainers in the inlet sockets and with valves in the outlet sockets and cooperating threads on the interior sides of the sockets and on the mediate portions of the plug to hold the plug permanently in position.

15. The junction fitting of claim 14 in which the outer portion of the socket is closed by a threaded plug.

16. A unitary dividing or junction fitting comprising a casting including a plurality of sockets receiving flow controlling fittings, means near the open end of the sockets for mounting the fitting, and a plurality of nipples for pipe terminals radiating from the sockets and integral with the casting.

17. A lubricant dividing fitting comprising a body having intersecting fluid passages therein and a plurality of screw threaded pipe connectors accessible from the exterior of the fitting and coaxial with the respective fluid passages, and adapted to provide fluid tight connections with supply and distributing tubes, said body having a bolt opening extending substantially into the interior thereof, the surface of said body through which the fastening end of said bolt is to protrude being conformed as a clamping seat, said seat being provided with outlet sockets, and flow metering devices inserted in said sockets, said fluid passages feeding said sockets.

18. A lubricant dividing fitting comprising a body having intersecting fluid passages therein and a plurality of screw threaded pipe connectors accessible from the exterior of the fitting and coaxial with the respective fluid passages, and adapted to provide fluid tight connection with supply and distributing tubes, said body having a fastening hole of length considerably greater than its diameter and extending substantially into the interior of the body, contiguous to but free from communication with said fluid passages, the face of said fitting through which the fastening end of the bolt is to protrude being conformed as a clamping seat, said body being provided with parallel outlet cavities, and flow metering plugs inserted in said cavities, said fluid passages feeding said sockets.

19. A lubricant fitting comprising a body and including a unitary body devoid of mounting lugs therefor, having intersecting outwardly extending fluid bores, tapped cavities at the exposed ends of the several bores, said bores having conically shelved bottoms to provide fluid tight connections with separate supply and distributing tubes, said body having a clamping seat at one side thereof and a bolt opening extending transversely through said seat and substantially into said body and being free from communication with said fluid bores and cavities, said body being provided with outlet sockets and flow metering devices inserted in said sockets, said fluid bores feeding said sockets.

20. A lubricant dividing fitting comprising a body having intersecting fluid passages therein and a plurality of screw threaded pipe connectors accessible from the exterior of the fitting and coaxial with the respective fluid passages, and adapted to provide fluid tight connection with supply and distributing tubes, said body having a bolt opening extending thereinto at right angles to said fluid passages, in contiguity thereto, but free from communication therewith, the surface of said body at one end of said bolt hole being conformed as a clamping seat, said body being provided with parallel outlet cavities, and flow metering plugs inserted in said cavities, said fluid passages being in liquid communication with said cavities.

21. A lubricant junction and dividing fitting comprising a body portion with a plurality of outlets and with a single inlet, said single inlet and one of said outlets being conformed for connection to a lubricant conveying conduit and the other outlets being enlarged so as to receive flow metering devices, and means intermediate said enlargements for attaching the fitting to a structure to be lubricated.

22. The fitting of claim 21 in which the enlargements consist of parallel sockets in which are press-fitted flow proportioning devices.

23. The fitting of claim 21 in which the enlargements consist of threaded sockets in which are screwed flow metering plugs.

24. The fitting of claim 21 in which the enlarged outlets are provided with means to enable lubricant tight passage from said enlargements to the machine to be lubricated.

WARREN O. WRIGHT.